(12) United States Patent
Burrage

(10) Patent No.: US 7,584,923 B2
(45) Date of Patent: Sep. 8, 2009

(54) TILT-ROTOR AIRCRAFT

(76) Inventor: Robert Graham Burrage, 1 The Chestnuts, Abingdon, Oxfordshire (GB) OX14 3YN ( * ) Notice: Subject to any disclaimer, the term of this patent is extended or adjusted under 35 U.S.C. 154(b) by 127 days.

(21) Appl. No.: 10/585,505

(22) PCT Filed: Dec. 23, 2004

(86) PCT No.: PCT/GB2004/005449

§ 371 (c)(1), (2), (4) Date: Jul. 7, 2006

(87) PCT Pub. No.: WO2005/066020

PCT Pub. Date: Jul. 21, 2005

(65) Prior Publication Data

US 2007/0158494 A1    Jul. 12, 2007

(30) Foreign Application Priority Data

Jan. 8, 2004    (GB) ................................. 0400335.6

(51) Int. Cl.
*B64C 27/28* (2006.01)
(52) U.S. Cl. ........................ 244/7 R; 244/56; 244/17.23
(58) Field of Classification Search .................... 244/6, 244/7 R, 7 C, 17.23, 17.25, 17.27, 56
See application file for complete search history.

(56) References Cited

U.S. PATENT DOCUMENTS

| 2,448,392 | A | * | 8/1948 | Quady et al. ................. 244/7 R |
| 3,254,725 | A | | 6/1966 | Higgins |
| 3,666,209 | A | | 5/1972 | Taylor |
| 4,979,698 | A | | 12/1990 | Lederman et al. |
| 5,046,684 | A | | 9/1991 | Wolkovitch |
| 5,085,315 | A | * | 2/1992 | Sambell ...................... 244/7 R |
| 5,381,985 | A | | 1/1995 | Wechsler et al. |
| 5,758,844 | A | | 6/1998 | Cummings |
| 5,863,013 | A | * | 1/1999 | Schmittle ...................... 244/48 |
| 6,367,736 | B1 | * | 4/2002 | Pancotti ...................... 244/7 R |
| 2002/0100835 | A1 | | 8/2002 | Kusic |
| 2003/0094537 | A1 | | 5/2003 | Austen-Brown |

FOREIGN PATENT DOCUMENTS

| DE | 12 62 127 B | 2/1968 |
| DE | 3829329 A1 | 3/1989 |
| DE | 44 43 731 A1 | 6/1996 |
| EP | 0 754 620 A | 1/1997 |
| GB | 0607924 A | 9/1948 |
| GB | 0962430 A | 7/1964 |
| RU | 2028964 C1 | 2/1995 |
| WO | WO 03/106259 | 12/2003 |

* cited by examiner

*Primary Examiner*—Michael R Mansen
*Assistant Examiner*—Michael Kreiner
(74) *Attorney, Agent, or Firm*—James F. Hann; Haynes Beffel & Wolfeld LLP

(57) ABSTRACT

A tilt-rotor aircraft (1) comprising a pair of contra-rotating co-axial tiltable rotors (11) on the longitudinal center line of the aircraft. The rotors (11) may be tiltable sequentially and independently. They may be moveable between a lift position and a flight position in front of or behind the fuselage (19).

13 Claims, 11 Drawing Sheets

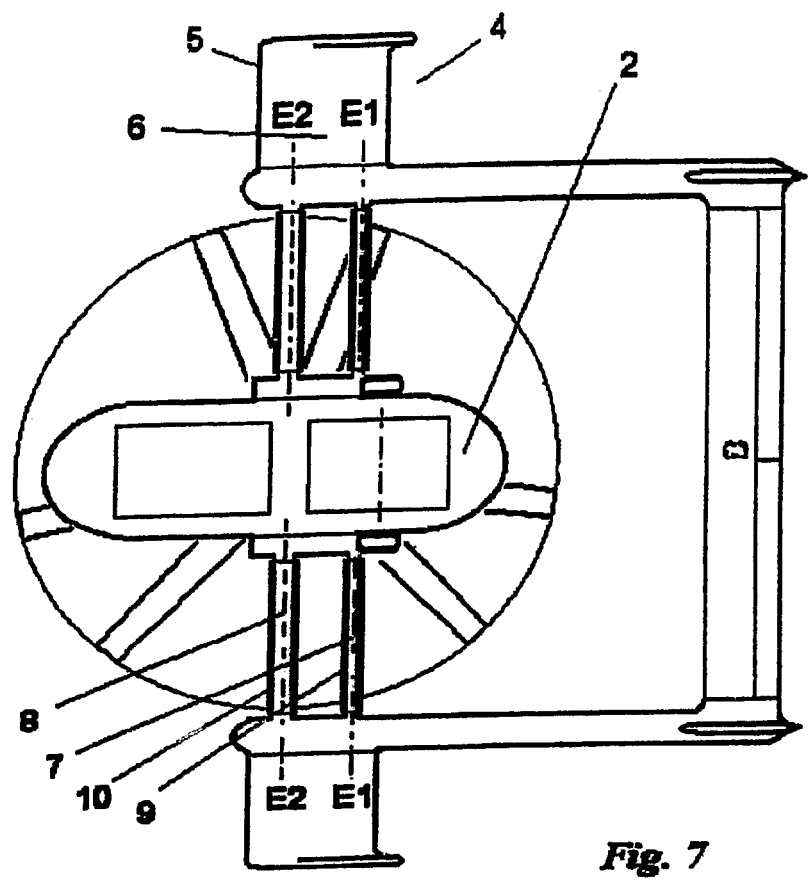
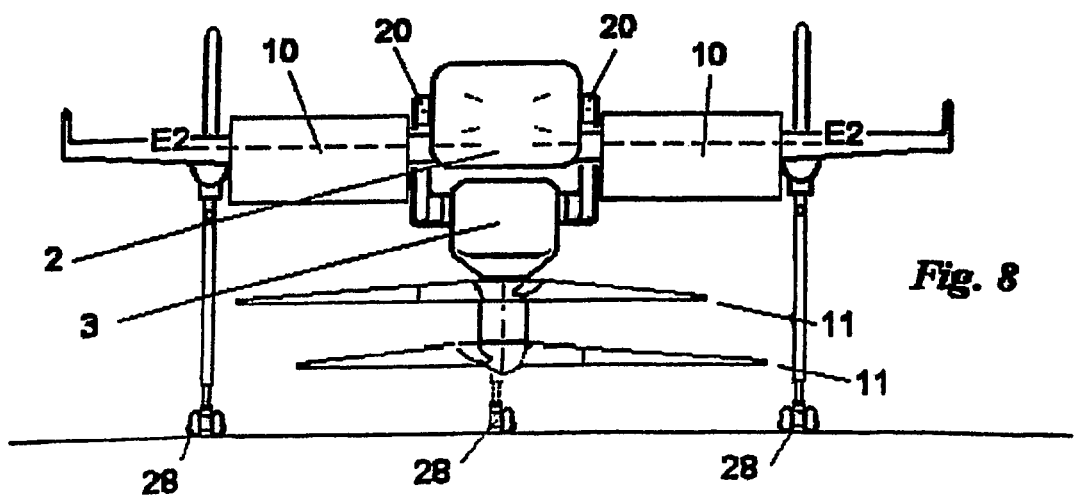
Fig. 7
Fig. 8

TILT-ROTOR AIRCRAFT

BACKGROUND OF THE INVENTION

As is known, there are many designs of aircraft, herein referred to as convertiplanes, seeking to combine the advantages of fixed-wing propeller aircraft and of helicopters, for example by use of tilt-rotors or by tilt-wings. Of these, arguably only the twin tilt-rotor designs are close to full production.

Twin tilt-rotor designs have a long history. In 1934, U.S. Pat. No. 1,951,817 was granted to Blount for his "airplane-helicopter". In 1958 the Bell XV-3 became the first tilt-rotor to convert to the aeroplane mode; a 15-year test programme proved that it could fly safely and smoothly throughout its flight envelope. The XV-3 was limited in speed by its use of blades designed for helicopter flight, and this was remedied in Bell's next project, the XV-15, by use of high twist blades. The first XV-15 was rolled out in 1976, and by 1986 the two prototypes had achieved an unofficial record for rotorcraft of 301 knots, had accumulated 530 flight hours and made 1,500 conversions. In that year a scaled-up version of the XV-15, a joint proposal by Bell and Boeing called the V-22 Osprey, was approved for full-scale development for the US armed forces, achieving its first flight in 1989. The V-22 eventually entered low-rate initial production in 1999, but subsequently was grounded after two crashes in 2000; revised flight tests began in May 2002 and it is now in limited production.

The most recent twin tilt-rotor is the Bell Agusta BA 609, which made its maiden flight on 7 Mar. 2003 as the world's first civil tilt-rotor and is configured generally as the V-22.

This history from 1934 to the present day shows painfully slow progress for the twin tilt-rotor concept. Over the same timescale a wide variety of helicopter designs have achieved large-scale production and valuable service worldwide. But even that success for helicopters is modest compared to that of fixed wing aircraft which have achieved production quantities, utilisation, safety, reliability, speed, range and altitude performance that are far better and at much lower cost than helicopters of equivalent payload.

The reasons for the relative success (or lack of it) of these three concepts lie in the economic cost of acquisition and operation.

Firstly, comparing a propeller driven fixed wing design with a helicopter design of equal payload, fuel load and installed turbine power:
- The weight of high cost machinery, ie. powerplant, transmission, rotor or prop blading etc needed by the fixed wing design is half that of the helicopter.
- The fixed wing design would be expected to have twice the cruise speed and much greater range.
- But the helicopter is VTOL capable, whereas the fixed wing design is not.

Secondly, comparing a twin tilt-rotor design with the above two designs:
- The twin tilt-rotor can be both CTOL and VTOL capable, the other two designs cannot.
- The range of the twin tilt-rotor will be much better than the helicopter but significantly less than the fixed wing design.
- However, in order to match the speed and CTOL capability of the fixed wing design and to match the VTOL capability of the helicopter, the twin tilt-rotor needs twice the installed turbine power.
- The weight of high cost machinery, ie powerplant, transmission, rotor or prop is twice that of the helicopter and four times that of the fixed wing design.

It is an object of at least the preferred embodiments of the present invention to provide a tilt-rotor aircraft in which the above disadvantages are reduced.

The term "rotor" is to be construed broadly, to include not only an open (helicopter-type) rotor, but also a ducted fan or ducted rotor.

In another aspect, the invention provides a tilt-rotor aircraft comprising a fuselage, wings for sustained forward flight, and at least one rotor tiltable between a position providing lift and a position providing propulsion for forward flight, the rotor or rotors being carried by supporting structure mounted on the fuselage and being disposed on or symmetrically about the longitudinal centre line of the aircraft.

In another aspect, the invention provides a tilt-rotor aircraft comprising a plurality of rotors carried by at least one tiltable nacelle on the longitudinal centre line of the aircraft.

The, or each, nacelle may have a pair of contra-rotating rotors which are coaxial, or on parallel axes, or intermesh.

A said nacelle or supporting structure may be mounted to pivot and optionally also translate about an axis extending transversely of an upper part of the aircraft fuselage.

The nacelle may contain at least one engine. Alternatively the engine(s) may be located elsewhere in the aircraft, and power may be delivered mechanically to the rotors or via a local power turbine, electric motor, hydraulic motor or other transmission.

The rotors preferably are driven by a plurality of engines via a transmission such that all the rotors continue to be driven if an engine fails.

The nacelle may be mounted to pivot and optionally also translate about an axis extending transversely of an upper part of the fuselage.

At least inboard portions of wings of the aircraft maybe moveable so as to present leading edges to the airflow generated from the rotors in lift mode.

In another aspect the invention provides a tilt-rotor aircraft comprising a tiltable rotor assembly on the longitudinal centre line of the aircraft moveable between a lift mode and a forward flight mode, inboard portions of the wings of the aircraft being moveable so as to present leading edges to the airflow generated by the rotors in lift mode.

A said moveable portion may be rotatable and/or translatable transversely or longitudinally about a fixed beam projecting from the fuselage of the aircraft.

The beam may extend to a fixed outboard portion of the wing. The fixed beam may be offset from the axis of tilt of the rotors either forwardly or rearwardly or vertically.

Preferably each wing may have at least two substantially parallel moveable portions.

A said moveable portion may be configured to act as a control surface when the aircraft is in lift mode and/or in transition between lift and forward flight modes, the aircraft also comprising control means for operating the control surface.

The underside of the aircraft fuselage may be shaped to reduce download forces on the fuselage from the airflow generated by the rotor or rotors in lift mode.

Preferably there is a control surface on the fuselage, operative when the aircraft is in a lift mode and/or in transition between lift and forward flight modes.

In a further aspect the invention provides a tilt-rotor aircraft comprising a tiltable rotor assembly moveable between a lift position and a forward flight position in front of or behind the fuselage.

Preferably in this aspect the aircraft is of a twin-boom layout, wherein booms extend rearwardly from the wings of the aircraft to support the aircraft's empennage, the rotor assembly being behind the fuselage and disposed between the booms when the aircraft is in forward flight mode.

In one embodiment, the rotor assembly is below the fuselage when in the lift position. In another embodiment it is above the fuselage.

The preferred embodiments of the invention have all the powerplant, transmission and rotor components within a single rotornacelle, allowing some components such as cross-wing transmissions to be eliminated and others such as support structures to be simplified.

In another aspect this invention provides a tilt rotor aircraft comprising a fuselage, wings for sustained forward flight, and a plurality of rotors, each rotor being independently and sequentially tiltable between a position proving lift and a position proving propulsion for forward flights.

In a preferred embodiment the powerplant may be within the fuselage.

Preferably the rotors are mounted on, or symmetrically about, the centre-line of the aircraft.

The rotors may be mounted at an angle of inclination to the roll axis or to the pitch axis of the aircraft. The angle of inclination may be up to 45 degrees, for example between 12½ and 32½ degrees, and preferably being substantially twenty two and a half degrees.

The angle of inclination may be variable.

Preferably the aircraft may comprise rotors which are substantially in mesh.

The aircraft may comprise a mechanism for varying the relative phase of the rotors to permit sequential tilting, preferably substantially in mesh.

Preferably the mechanism may comprise a cross-shaft.

The tilt axis of the rotors may be vertically or longitudinally offset from the point of convergence of a longitudinal axis of each rotor.

The rotors may have a common cross-shaft. The gear ratios between the cross-shaft and the rotor shaft for a two bladed rotor design may be of a 2:3 ratio. For a three or more bladed rotor design the cross-shaft preferably includes a differential gearbox with means to input mesh phase correction.

The flight positions are preferably to the rear of the fuselage and the lift positions are preferably substantially vertical, or tilted towards the front of the fuselage by up to ten degrees, preferably up to five degrees. The flight positions may be between ninety and one hundred degrees from the lift positions. Preferably the flight positions are substantially ninety five degrees from the lift positions.

In a further aspect the invention provides a tilt-rotor aircraft comprising a fuselage, wings for sustained forward flight, front and rear rotors mounted on the aircraft fuselage for providing lift at least one of the rotors being tiltable between a lift position and a position providing propulsion for forward flight.

Both rotors may be tiltable between lift and propulsion positions.

One rotor may be deployable to an autogyro configuration for forward flight, or can be folded in flight.

The aircraft may be operable in three flight modes, a first of which is in use below a first air speed, a second of which is in use between the first airspeed and a second airspeed, and a third of which is in use above the second airspeed. The aircraft may comprise a controller which can automatically manage transitions between these flight modes.

Alternatively the aircraft may comprise means for sensing dynamic air pressure arising from air speed, the aircraft being operable in three flight modes determined with reference to dynamic pressure, the first-mode being used below a first dynamic pressure, the second mode between the first dynamic pressure and a second dynamic pressure and the third mode above the second dynamic pressure.

The second flight mode is preferably a compound mode in which at least one of the rotors is in the flight position or at least one of the rotors is in the lift position. Preferably at least one of the rotors is substantially in the flight position and one of the rotors is substantially in the lift position in the second flight mode.

The first air speed or first dynamic pressure may be sufficient for the wings to take substantially half of the aircraft lift, and the second air speed or second dynamic pressure may be sufficient for the wings to take substantially all of the aircraft lift.

The rotors may be moveable into a feathered position so that they may be tilted between lift and flight positions or held in or between those positions more easily.

Any of the aspects of the invention described above may be combined with any other of the aspects of the invention to provide an improved tilt-rotor aircraft.

Other advantages which may be achieved with various embodiments are the following:—

- Co-axial, contra-rotating rotors enable gyroscopic forces and rotor torques to be balanced within the rotornacelle or at the fuselage rather than across the aircraft wing structure.
- An aircraft having a single centrally mounted and aerodynamically symmetrical rotornacelle, is much less vulnerable to asymmetric airflow and asymmetric thrust. This is a particular concern in low speed and hovering flight. For example a twin-prop airplane that loses all thrust from one side becomes more difficult to manoeuvre or land or take off at low speed, where yaw problems can escalate into irrecoverable roll. Wing mounted twin tilt-rotor designs typically guard against this problem of asymmetric loss of power by the use of complex cross-wing transmissions between their engines, however this cannot compensate for major asymmetry of airflow from the rotor on one wing to the other. Such problems occur when one rotor enters or leaves the vortex ring state before the other, and when in ground effect the flow symmetry is destroyed by proximity to other aircraft disturbing the air or by physical discontinuities of the effective ground surface.
- The aircraft wing design can be optimised without the restraints imposed by mounting engines, nacelles or rotors on the wings.
- The aircraft can be designed for efficient lift in both transition and helicopter modes by minimising the download from the rotor airflow that acts on the fuselage and wing. This is achieved by ventral fairing of the fuselage, and by aligning the inboard portions of the wing to the airflow. Both methods also provide the possibility of use as control surfaces for the aircraft.
- In "pusher" embodiments the field of view from the cockpit is unobstructed by the tilt rotors.

BRIEF DESCRIPTION OF THE DRAWINGS

Some preferred, non-limiting embodiments of the present invention will be described by way of example with reference to the accompanying drawings, in which:—

FIGS. 7 and 8 show front and plan views of the convertiplane of FIG. 5 in helicopter mode;

DETAILED DESCRIPTION OF THE INVENTION

Figure 1:
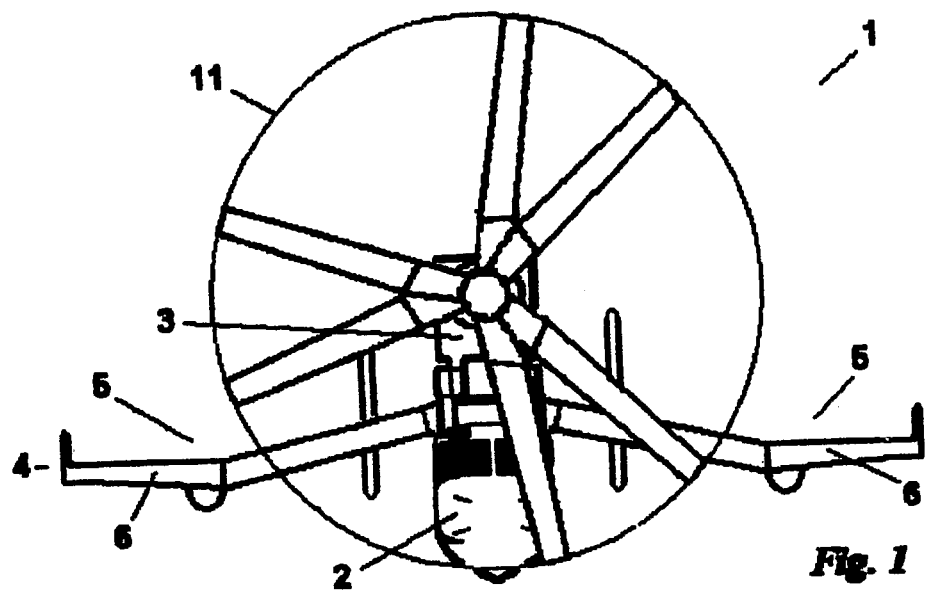
FIGS. 1 and 2 show front and plan views of a first embodiment of a convertiplane, in the airplane mode, in accordance with the present invention.
Figure 2:
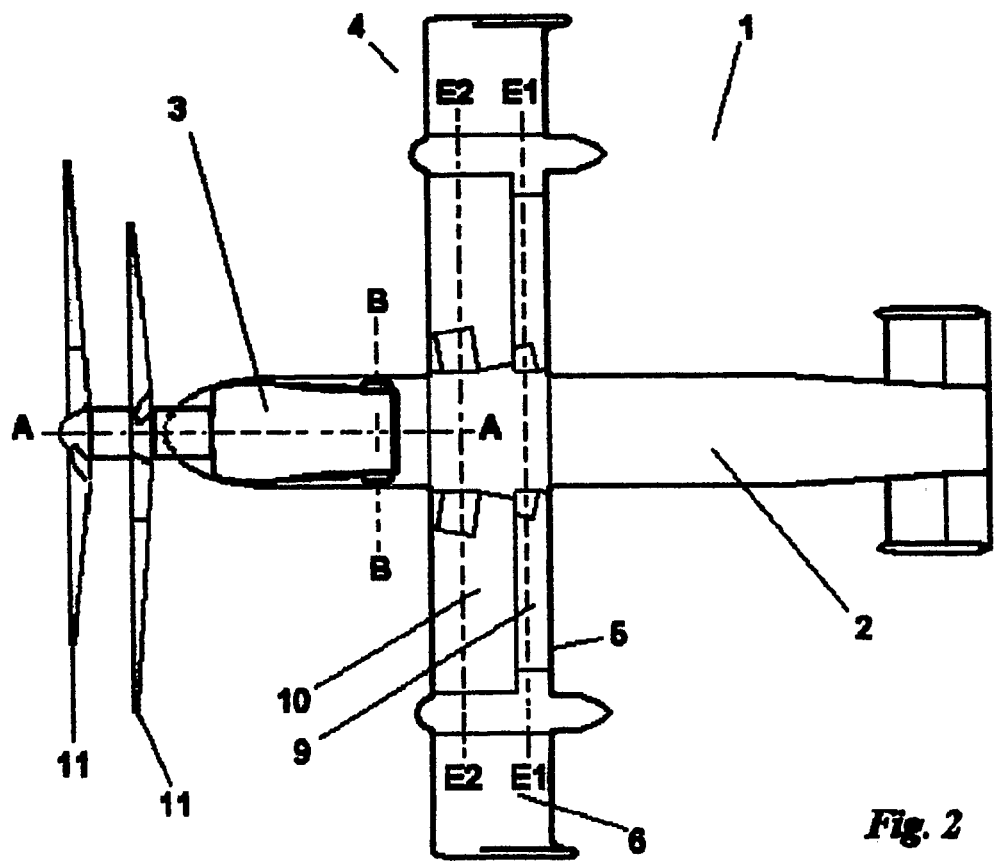
Figure 3:
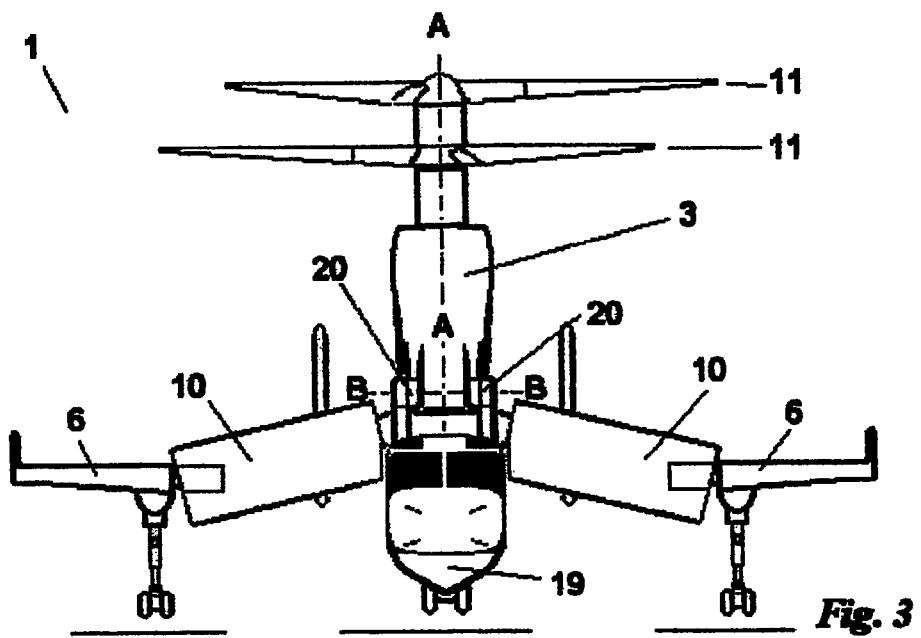
FIGS. 3 and 4 show front and plan views of the convertiplane of FIG. 1 in helicopter mode.
Figure 4:
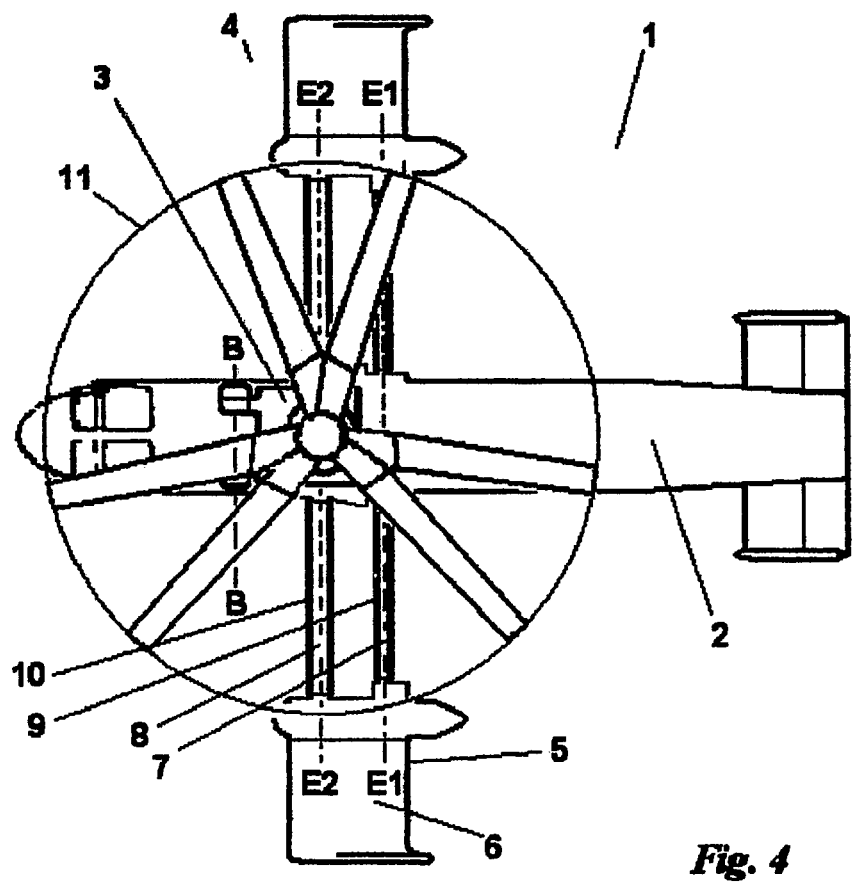

With reference to FIGS. 1 to 4, a convertiplane 1 comprises a fuselage 2, a rotornacelle 3 attached above the fuselage 2, and a wing 4.

The rotornacelle 3 supports two rotors 11 that rotate in opposite directions about the common axis A, so setting aside other influences, the force vector produced by the rotors 11 is aligned to axis A. The rotornacelle 3 houses the engines and known devices—not forming part of the present invention and therefore not shown—for transmitting power to and for controlling the cyclic and collective pitch of the rotors 11. In particular the rotors are coupled through a differential gear to equalise the torque supplied to each, any imbalance relative to axis A manifesting itself as a torque reaction on the differential casing which is transmitted to the airframe. This torque imbalance is cancelled by control of the relative collective pitch of the two rotors, and this also is employed to maintain yaw control of the aircraft in hover mode and at low airspeeds. For this reason it is unnecessary to provide the aircraft with a tail rotor or similar torque balancing system.

The rotornacelle 3 is attached to the fuselage 2 by two actuation devices 20, such as inter-connected geared-down electric motors. The two actuation devices 20 are used to rotate rotornacelle 3 about the axis B between a helicopter mode where axis A is substantially vertical, and an airplane mode where axis A is substantially horizontal. Each device 20 comprises a load bearing casing, electric motor, fail safe, devices, monitoring devices and a high torque output reduction gearbox. The devices are configured to provide high integrity rotary actuation capable of supporting the weight of the aircraft in hover mode and to achieve translation to and from forward flight in about ten seconds.

The devices 20 may be arranged to provide translation as well as rotation, for example by interposing beams or pivot arms between the axis B and pivotal connections to the nacelle. This may allow a more compact movement between lift and forward flight positions. Differential control of the actuators in such arrangement can vector the rotor thrust, perhaps permitting cyclic pitch control to be omitted, or to assist in aircraft trimming, and aircraft CG balancing.

Wing 4 has two halfwings 5, each having an outer portion 6 attached to two fixed beam elements 7, 8 that project from the fuselage 2, so that wing 4 is fixed relative to the fuselage 2 and the outer portions 6 are substantially outside the airflow of the rotornacelle 3.

The aircraft is configured to reduce the detrimental download forces that rotor airflow can create on the wing surfaces within its flow field. The inner part of each halfwing 5 comprises two inner wing portions 9, 10 movable so as to rotate about the respective axes E1 and E2 of the fixed beam elements 7, 8. In the airplane mode the two inner wing portions 9, 10 are held flush with the outer portion 6 to form a conventional wing. In the helicopter mode, and in the transition mode between airplane and helicopter, the two inner wing portions 9, 10 are aligned substantially to the local airflow so as to virtually eliminate the detrimental download forces of rotornacelle 3 airflow that otherwise would act on wing 4. The drag coefficient of an airfoil at right angles to the airflow may be as high as 2 but is reduced one hundredfold when substantially aligned to the airflow. The inner wing portions 9, 10 may be used as aircraft control surfaces to supplement or take-over from conventional secondary and primary surfaces which progressively lose their effectiveness due to lack of forward airspeed as the aircraft converts to helicopter mode.

For all flight modes the inner wing portions 9, 10 will be aligned substantially to the local airflow i.e. to the wash resulting from the rotornacelle and air movement relative to the aircraft. In helicopter and transition modes the purpose is to eliminate download (drag) forces on the wings; in the airplane mode the purpose is to provide lift with minimum drag. Using displacement from alignment also provides aircraft control forces and moments. The most important control uses are as airbrakes in transition mode and as high lift surfaces in slow airplane mode flight. Equally their differential positioning (wing to wing) produces a moment: In hover and transition this may be used for yaw control for example in an embodiment where differential collective pitch is not available. In airplane mode it may be used for roll control.

The inner wing portions 9, 10 may be alternatively removed from the rotor downwash simply by translating them longitudinally (outwardly) of the wing along the beam elements 7, 8. Then they may be accommodated within or overlapping the outer wing portions, or may be deployed beyond them to lengthen the wings. When just the beam elements 7, 8 are exposed to the rotor downwash the downforce on the wing may be reduced tenfold.

Translation of the inner wing portions 9, 10 transversely of the beam elements in the manner of flaps as well as pivoting then enables the inner wing portions to be used even more effectively as left-augmenting and/or flight control surfaces in forward flight and transition, for example by increasing the effective wing area, angle of attack and curvature of the effective airfoil.

Additionally, the download forces associated with air from the rotornacelle 3 flowing downwards around the fuselage 2 are minimised by suitably fairing the underside of the fuselage 2 as shown at 19. Panels set into the fuselage may be deployable for control purposes. For example, in search and rescue and other missions where rope or winch access is needed in hover, panels deployable as symmetrical diverters can be provided at the shoulders of the fuselage so as to disperse the downwash to give calmer air immediately beneath the fuselage. In another example a fin is disposed along the length of the apex of faired portion 19, and is rotatable about an axis at the apex parallel to the longitudinal axis of the aircraft to generate side forces when the aircraft is hovering in a side wind so that aircraft alignment is preserved for VTOL in constrained landing sites, or so that aircraft pointing may be retained for observation, aiming or weapon release purposes. Tricycle landing gear 22 is provided.

A typical flight for convertiplane 1 is envisaged as take-off, climb to chosen altitude, cruise, descent from altitude, and landing. For each phase of the flight the pilot may choose to fly the convertiplane in any one of the helicopter, transitional, and airplane modes, subject to flight regulations and envelope. To illustrate operation of the convertiplane 1, a flight plan will be assumed which starts with a conventional airplane runway take-off, climb and cruise, and then uses the transitional mode for descent, and lands using the helicopter mode.

In preparation for take-off the rotornacelle 3 is aligned substantially horizontally and remains thus through take-off, climb and cruise. The rotornacelle 3 may be trimmed in this conventional airplane mode to optimise the aircraft's attitude for efficient flight and for CG balancing. Descent is entered by reducing forward speed to the point where the desired rate of descent is achieved; this may be by reducing engine power, use of air brakes or such other conventional airplane primary and secondary control surfaces as provided or by deployment of inner wing portions 9 or 10 as airbrakes, or a combination of all such. At an appropriate distance form the intended landing site, the engine power and the angle from horizontal of the rotornacelle 3 are steadily increased and forward speed further reduced, by means as just described, so entering the transitional mode. The transition continues until the rotornacelle 3 is aligned substantially vertically, and the convertiplane has thereby entered the helicopter mode and is landed as such. Throughout transition and helicopter modes the inner wing portions 9 or 10 are substantially aligned to the local airflow and are able by use of small deflections to produce significant forces to assist change of aircraft forward speed, change of wing lift and change for control and manoeuvring.

Vertical take-off and transition to forward flight is essentially the reverse of the forward flight to hover transition and vertical landing described above. In hover and in forward flight at helicopter speeds, cyclic pitch can be used to keep the rotor thrust vector passing through the aircraft CG. At aircraft flight speeds, the horizontal tail control surfaces take over this duty.

Figure 5:
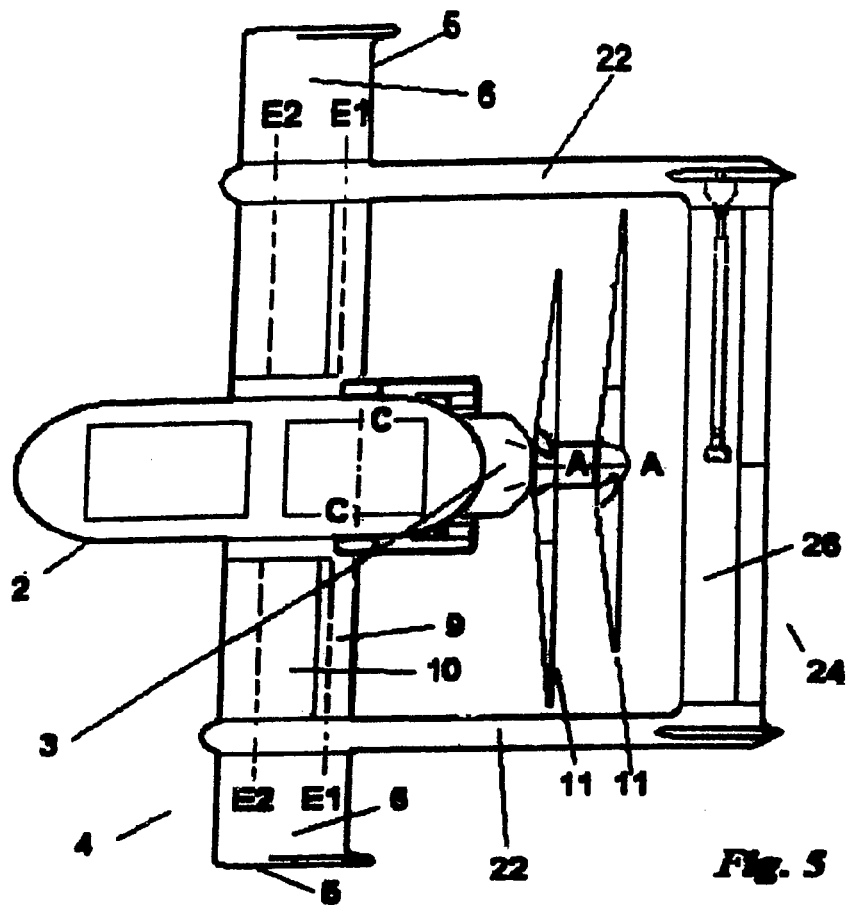
FIGS. 5 and 6 show front and plan views of a second embodiment of a convertiplane in accordance with the invention, in airplane mode.
Figure 6:
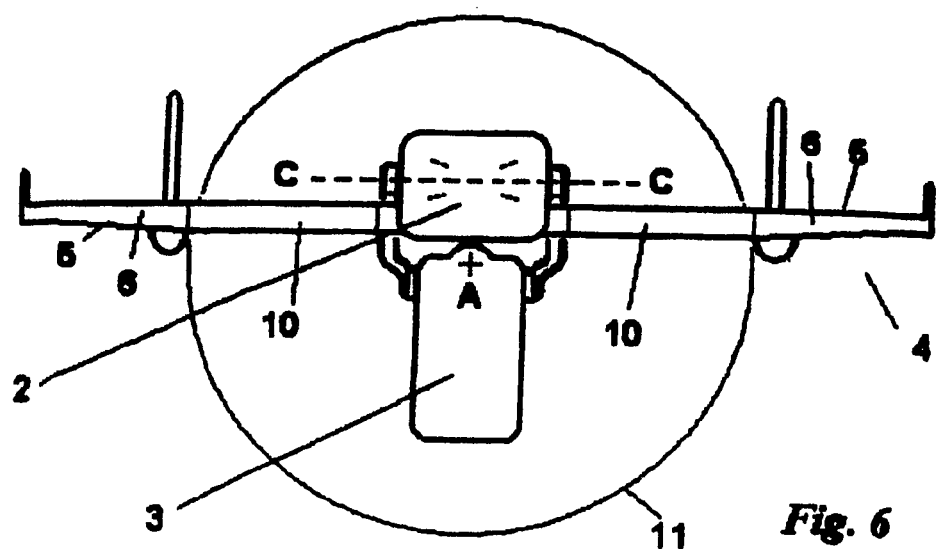

Referring to FIGS. 5 and 6, there is shown another embodiment of the invention configured as a pilotless aircraft. Parts already described with reference to FIGS. 1 to 4 carry the same reference numerals.

The aircraft is of a high-wing twin-boom layout, booms 22 extending rearwardly from the inboard end of outer half-wings 6 to support the aircraft's twin empennage 24 and horizontal stabiliser 26. Moveable half wings 5 are provided as in the FIG. 1 embodiment.

The rotornacelle 3 is pivotally mounted about a transverse axis C at the rear of the fuselage 2. For stability on the ground, tricycle undercarriage 28 with a tailwheel is provided.

In lift (helicopter) mode the rotornacelle is pivoted so as to dispose the rotors below the fuselage as shown in FIG. 7, the moveable inner wings being positioned to avoid obstructing the flow of air to the rotors. During transition to forward flight the rotornacelle is rotated gradually into the position shown in FIG. 5 in which the rotors act as a pusher propeller between the booms 22. The moveable portions 9, 10 are progressively pivoted so as to offer minimum drag to the airflow passing through the rotors. The relatively high velocity of this flow over the half-wings assists in generating lift. The portions 9, 10 in this embodiment may in particular be used to control yaw, enabling the relatively complex differential control of collective pitch to be omitted, with attendant cost savings.

The transition from forward flight to helicopter mode is as described for the FIG. 1 embodiment.

A variant of this embodiment is to mount the rotornacelle above the fuselage on pylons or supports spaced wider than the width of the rotors (for example at junctions between the booms 22 and the wings 4), and sufficiently tall for the tilt axis C to be positioned for the rotornacelle to move from a lift position beneath the axis C but above the fuselage to a flight position behind it. The pylons may be pivotally connected both to the nacelle and to the boom junctions to enable the nacelle to be positioned lower in the forward flight position, with its thrust vector passing closer to the aircraft CG.

For example, the open rotors may be enclosed within a rim or very short duct to form ducted rotors with collective and cyclic pitch as already described.

Alternatively ducted fans with a larger number of blades of fixed or collective pitch may be used. Whilst the duct would bring a cost and weight penalty, a ducted rotor or fan would have less noise from blade vortex interference and possibly reduced susceptibility to vortex ring state.

Instead of being coaxial the contra-rotating rotors may be disposed on spaced axes side by side, so that viewed from the front the rotornacelle appears U-shaped, the engine and tilt axis forming the base and two side-by-side rotor masts forming the sides of the U. The masts would be just over a rotor radius apart and equally spaced about the aircraft centre line, the contra-rotating rotors being geared together so as to intermesh. Alternatively the rotors may co-rotate provided the masts are of different heights or spaced more than a rotor diameter apart. Some means of compensating for torque reaction on the airframe (eg. a tail rotor) then would be necessary.

A further variation is to employ contra-rotating intermeshing rotors with rotor masts close together but at a slight angle to each other symmetrically about the aircraft centre line, so that they present a V-shaped appearance viewed from the front. The rotor masts are canted outwards no more than is necessary for the blades to intermesh with adequate clearance.

A large aircraft may have two separate tiltable contra-rotating rotors, one at the front and one at the rear, each being carried on a tiltable nacelle. Alternatively each rotornacelle may have a pair of contra-rotating rotors.

Figure 9:
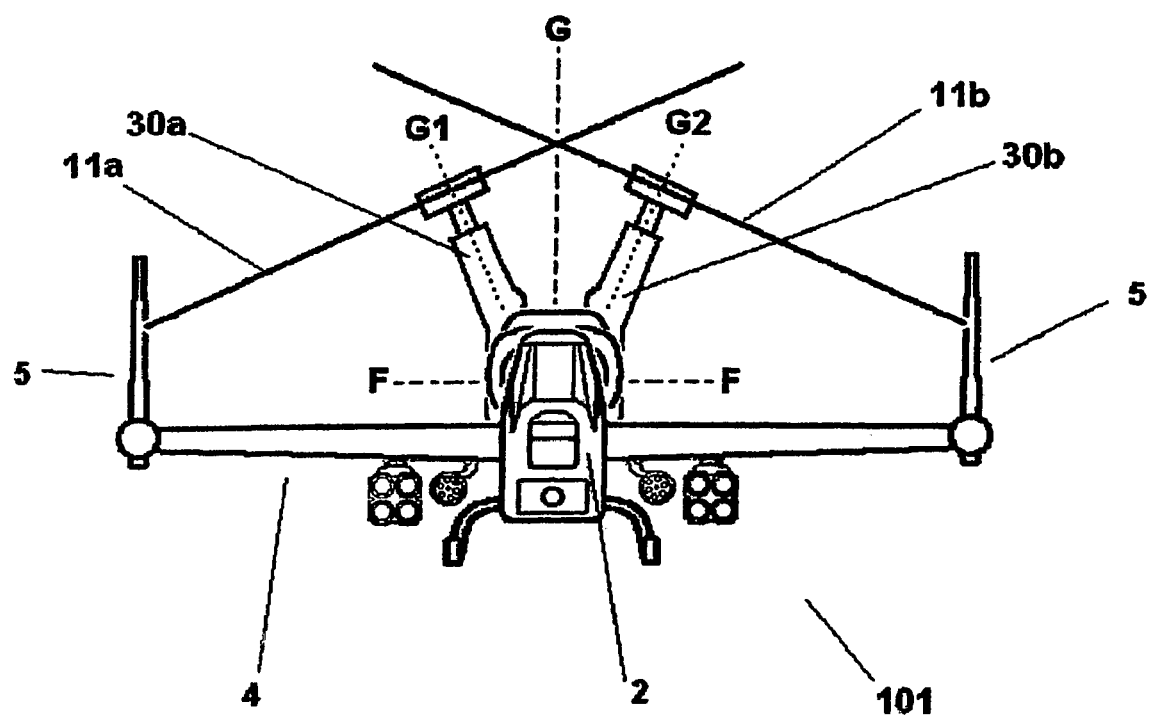
FIGS. 9, 10 and 11 show front, plan and side views of a third embodiment of a convertiplane in accordance with the invention.
Figure 10:
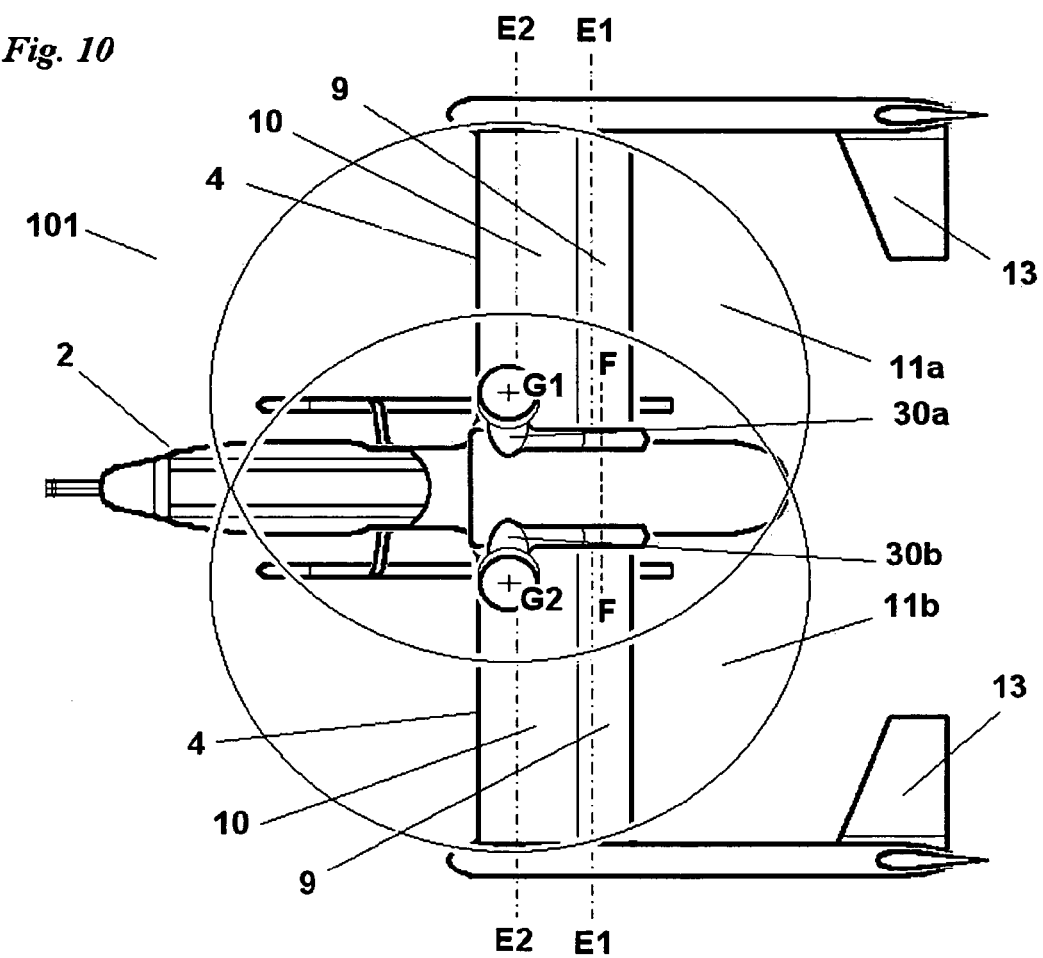
Figure 11:
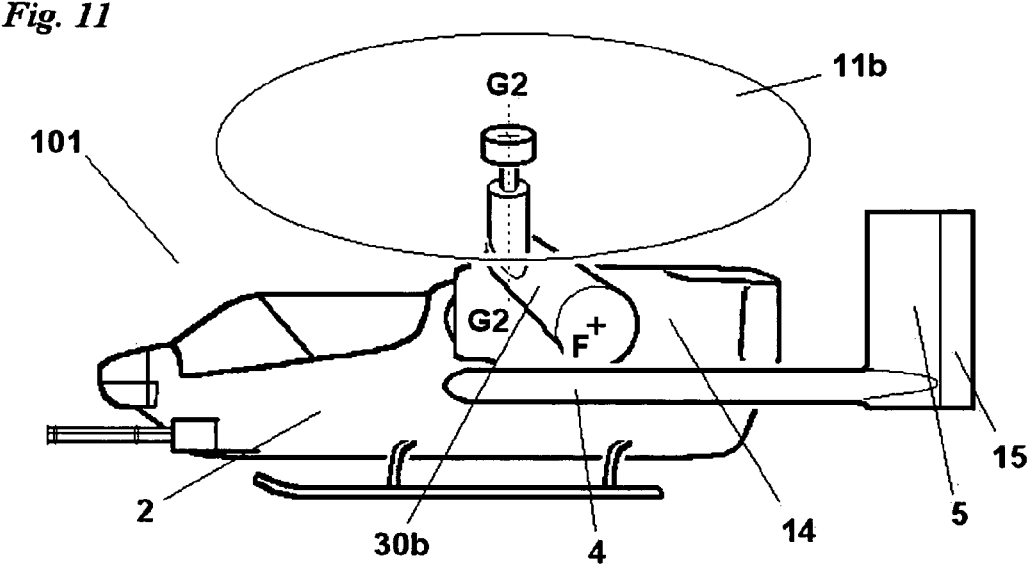
Figure 12:
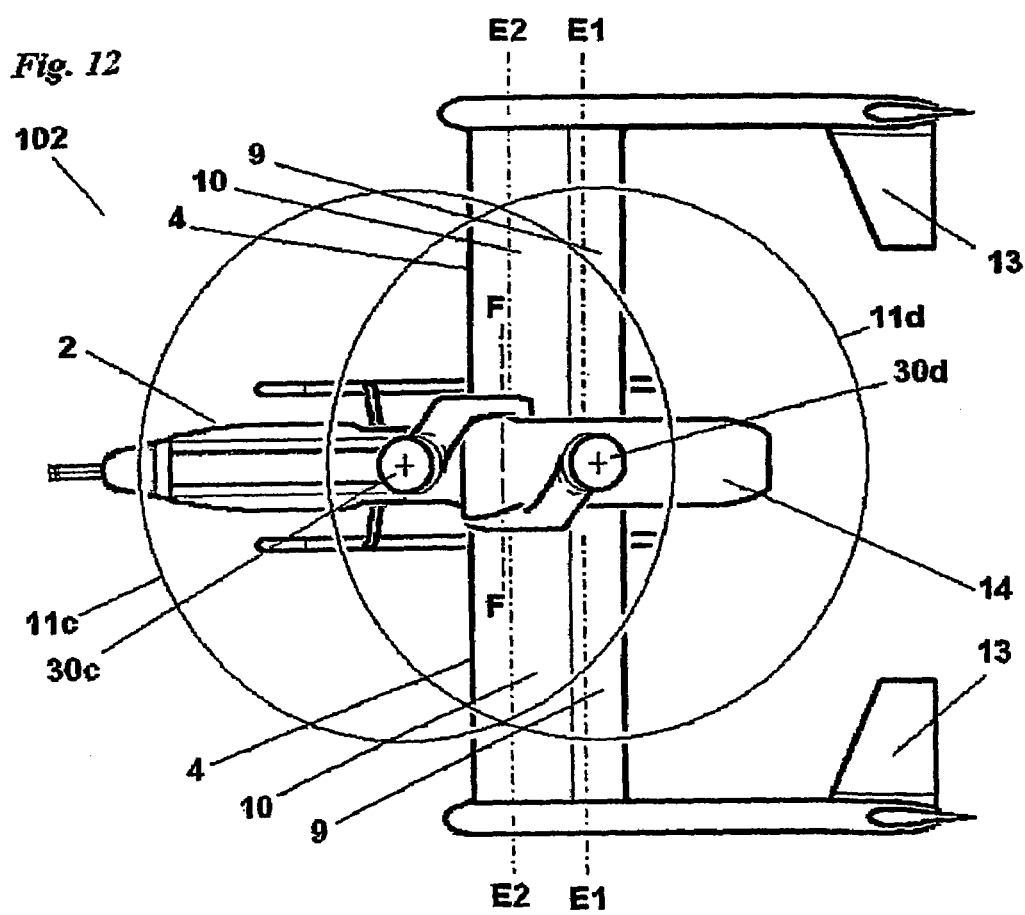
FIG. 12 shows a plan view of a fourth embodiment of a convertiplane in accordance with the invention.

A third embodiment is shown in FIGS. 9 to 11, aircraft 101, configured as a gunship. Parts already described with reference to FIGS. 1 to 6 carry the same reference numerals. A fourth embodiment is shown in FIG. 12, aircraft 102, where the rotors are arranged in tandem rather than side-by-side. A version of aircraft 101, simplified wherever possible, can be used as a light civil aircraft, suitable for the general aviation and sports market.

In the embodiments of FIGS. 9 and 11, twin rotors 11*a*, 11*b* are mounted on separate pylons 30*a*, 30*b*, which are capable of tilting independently. The pylons 30*a*, 30*b* are pivotally mounted about a transverse axis F at the rear of the fuselage 2. The pylons are canted away from each other about a vertical axis G; a first pylon extending along an axis G1 and a second along an axis G2. In this embodiment, the pylons are canted at approximately 45° relative to each other, each being inclined approximately 22.5° from the vertical axis G.

The rotors 11*a*, 11*b* are driven in opposing directions from a common cross-shaft mounted aligned to the tilt axis F-F. At any identical tilt angle of the pylons 30*a*, 30*b*, the rotors turn at the same speed and in perfect mesh. As the relative tilt changes, the phase needed for perfect meshing changes non-linearly. The gear ratio of the cross-shaft to the rotor shaft compensates for some of the phase change, although linearly.

For example, for a configuration where F-F lies at the convergence of G1 and G2, which are canted at a relative angle of 45°, a gear ratio of 1:2 will give acceptable mesh angles for two-bladed rotors. Rotors with more precise meshing requirements may need a differential gearbox within the common cross-shaft to allow the input of further phase non-linearly with relative tilt.

Figure 13:
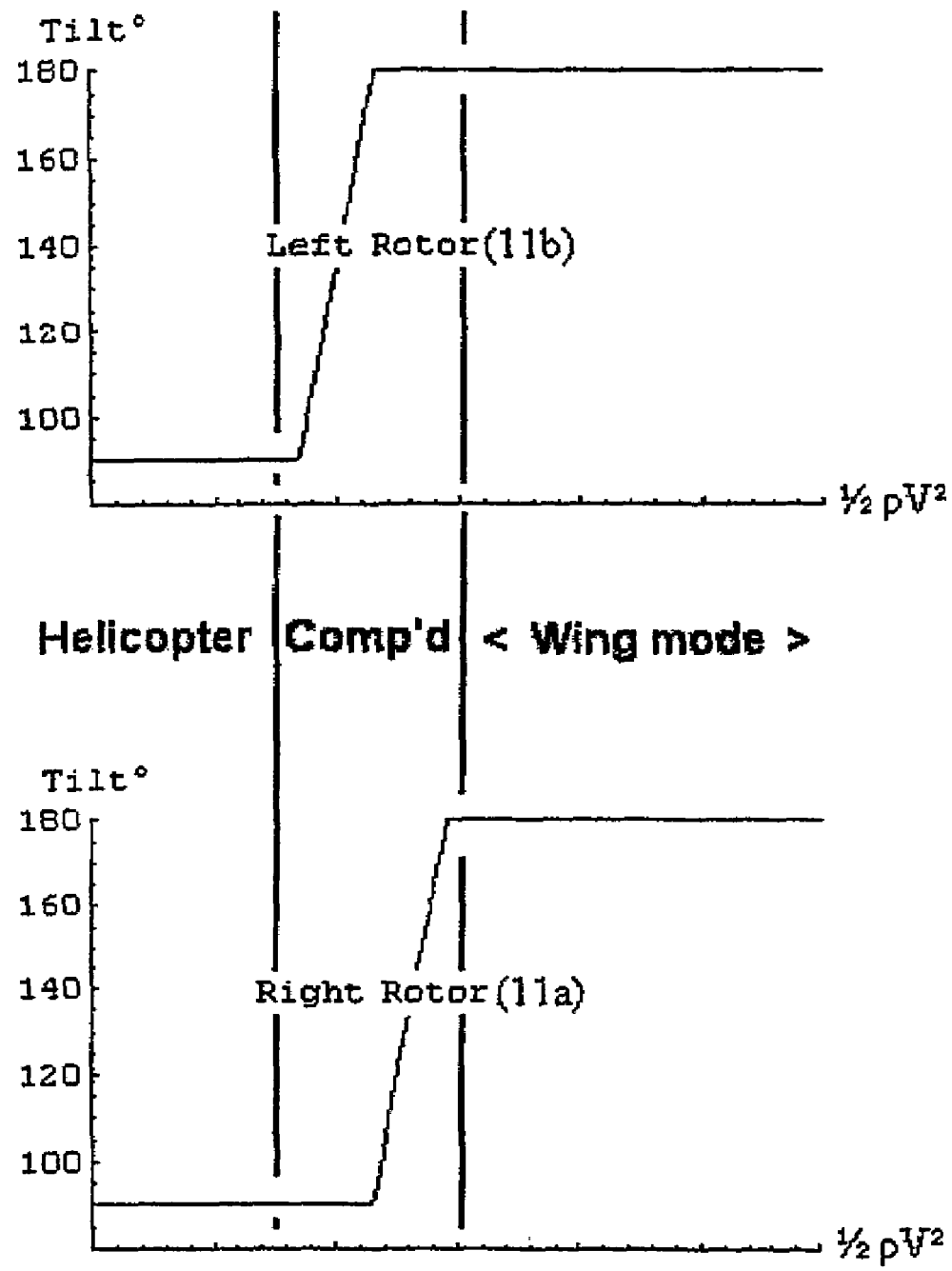
FIG. 13 shows schematic representations of the tilt as a function of dynamic pressure for left and right rotors.

The various modes of flight, and the transitions between them, are illustrated in FIG. 13. In lift (helicopter) mode, the pylons 30*a*, 30*b* are substantially vertical in the fore-and-aft (pitch) plane, or tilted forward a little, for example 85° from the horizontal for forward flight. When dynamic pressure (0.5 $\rho V^2$ where $\rho$ is the density of the fluid the aircraft is travelling through and V is its velocity) is sufficient for the wings to take about half the aircraft lift, the compound flight mode is entered. As dynamic pressure (0.5 $\rho V^2$) increases, the first rotor 11a is rotated forward to 80° tilt where it takes over all the rotor lift and propulsion task, allowing 11b to be feathered and rotated to 180° to takeover propulsion. Once dynamic pressure (0.5 $\rho V^2$) is sufficient for the wings to take all the aircraft lift, the first rotor 11a is feathered, then tilted back, to share the pusher propeller duty.

Above this dynamic pressure the aircraft remains in the wing mode, with the wings providing all the lift and the rotors acting as conventional pusher propellers, except that each remains inclined to the aircraft centre line so that the rotors continue to mesh and each rotor is clear of the mast of the other. The angle of inclination is generally as small as possible so that the component of rotor thrust which is orthogonal to the aircraft centre line is as small as possible. To this end the angle of inclination can be made variable, and controlled so that any necessary relative phase changes are introduced to the rotors during variation of the angle of inclination. The principles and the methods of achieving it are basically similar to those applicable to variations in the relative tilt of the rotors. Variable rotor inclination may also be found advantageous in the hover mode, for example in a strong cross-wind in circumstances where it is not possible to turn the aircraft into the wind.

The use of dynamic pressure as a parameter for control purposes has the advantage of simplicity on two counts: sensing and application. It is simpler to sense because it is the true output of a Pitot-static probe (the difference between total and static pressure) requiring no compensation for air density or linearisation (as is needed to compute air speed from dynamic pressure). It is simpler to apply because a force or torque from a wing or control surface can be estimated from the simple product of the relevant aerodynamic coefficient times surface area times dynamic pressure.

However, because the aircraft will in any event have means for computing its air speed, the output from this system can if preferred be used instead of dynamic pressure as a control parameter, first and second airspeeds being used instead of the first and second dynamic pressures above described.

In the general aviation version of FIGS. 9 to 11, the rotor control of the aircraft is simplified by having no cyclic pitch; the flight control system is simplified by the surfaces being mechanically operated and the rotor tilt schedule is operated from a single lever, either mechanically or through an optional auto-tilt unit. Additionally, the tilt axis F-F is vertically offset upwards from the point of convergence of the axes G1 and G2 so that no differential gear-box may be required to ensure acceptable blade meshing for two, three or four blade rotors.

The angles of the pylons in the various modes of flight are summarised in the table below, where right and left are for the pilot:

|  | Aircraft flight mode | | |
| --- | --- | --- | --- |
|  | Helicopter | Compound | Wing |
| Right pylon (11a) angle of tilt | 85° | 80° to 180° | 180° |
| Left pylon (11b) angle of tilt | 85° | 85° to 180° | 180° |

In the helicopter and wing modes the controls are mainly used conventionally to trim and manoeuvre the aircraft. However, the controls are in some respects different from those in conventional tilt rotor aircraft, as shown below:

| | Helicopter Mode | | |
| --- | --- | --- | --- |
| | XV-15, V22, BA609 | Aircraft 101 | GA version of Aircraft 101 |
| Pitch | Longitudinal cyclic | Longitudinal cyclic | Tilt |
| Thrust | Collective | Collective | Collective |
| Roll | Differential collective and lateral cyclic | Lateral cyclic | Differential blocked wings |
| Side Force | Lateral cyclic | Differential collective | — |
| Yaw | Differential longitudinal cyclic | Differential longitudinal cyclic | Differential wings |

For the general aviation GA version of aircraft 101, in helicopter mode, the front portions 10 and the rear portions 9 of the wings are aligned substantially to the rotor downwash, ie the same angle of incidence.

The term "Differential wings" means that to yaw to the left, the front and rear portions 9, 10 of the left wing are tilted back and the front and rear portions 9, 10 of the right wing are tilted forward. The term "Differential blocked wings" means that to roll to the left, the front and rear portions 9, 10 of the left wing are tilted towards each other, so blocking some of the rotor downwash.

| | Wing Mode | | |
| --- | --- | --- | --- |
| | XV-15, V22, BA609 | Aircraft 101 | GA version of Aircraft 101 |
| Pitch | Elevators | Elevators | Elevators |
| Thrust | Collective | Collective | Collective |
| Roll | Flaperons | Differential wings | Differential wings |
| Yaw | Rudder | Rudder | Rudder |

For both of these aircraft, in wing mode the front portions 10 and the rear portions 9 of the wings are aligned to form a normal single wing. However the rear portions of the wings 12 can still be used as flaperons, which control is referred to in the table above as "differential wings".

In compound mode the control is unconventional in that while a rotor is tilted back to the 180° propeller position, its collective pitch is feathered to generate zero lift. Once 180° tilt is achieved, the collective pitch is set negative to generate useful forward thrust. Other controls can be washed in or out as appropriate to the tilt of the rotors.

During this process the other rotor and the wings provide continuity of lift and thrust for the aircraft, and the controls provide continuity of trim and manoeuvre.

On entry into the compound flight mode the first rotor 11a, tilted at 80°, is fully loaded and the second rotor 11b is feathered. The angle of cant of the first pylon 30a means that the first rotor 11a generates a side force to the right. As the second rotor 11b is feathered, it cannot counter this force, and the fins 5, 13, 15 must do so. For counter-clockwise rotation (from above), the fins counter both torque and side-force. For clockwise rotation the fins can counter the torque only, and at the expense of adding to the side force. Therefore it is important to ensure that the fin area, the fin arm length and the direction of rotation of the rotors have been considered carefully in the design.

The geometry of ideal, rigid tilting of rotors with blades of negligible chord and thickness can be described with the following reference points and parameters:

α° the angle that the rotor masts are canted relative to each other

J the point of convergence of the axes G1 and G2

{x, y, z} airframe axes with origin at J tilt axis, F-F, through the offset point {offxx, 0, offzz} offxx rearwards and offzz upwards as a proportion of length, J to rotor hub

β the angle of tilt of the rear rotor relative to the front rotor

Ø° phase introduced by the common cross-shaft to the rotors

It is assumed that the common cross-shaft lies on the tilt axis G to drive the rotor shafts in opposite directions. With zero offset the correction needed from P is $$\text{ArcCos}\left[\frac{1 + \text{Cos}[\alpha] - 3\text{Cos}[\beta] + \text{Cos}[\alpha]\text{Cos}[\beta]}{3 - \text{Cos}[\beta] - \text{Cos}[\alpha] - \text{Cos}[\alpha]\text{Cos}[\beta]}\right]$$

The error in ideal meshing can be described by a function such as $$\text{meshError}°[\alpha°,\beta°,\text{offxx},\text{offzz},\emptyset°]$$

Figure 14:
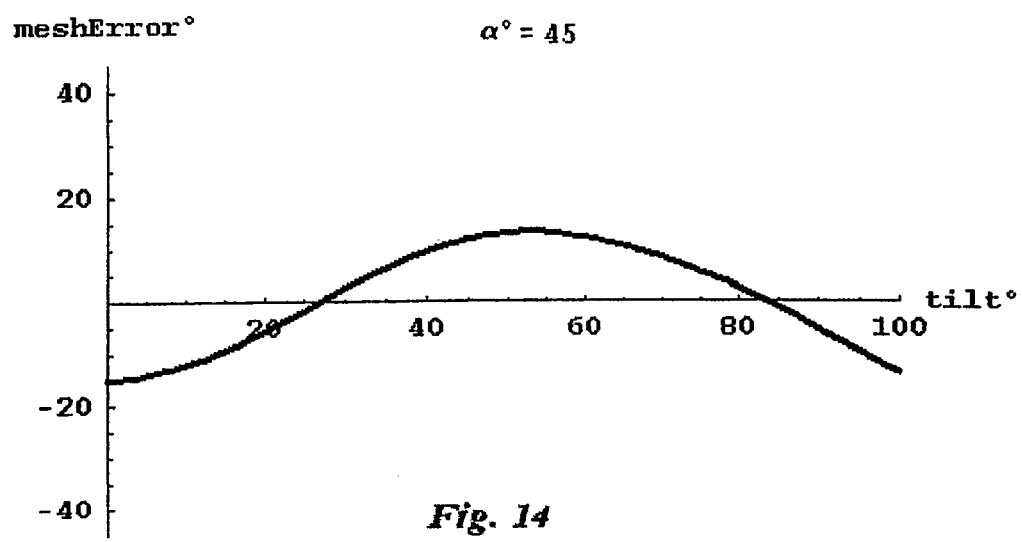
FIGS. 14 and 15 show graphs of the mesh error for different rotor blade meshing setup values.
Figure 15:
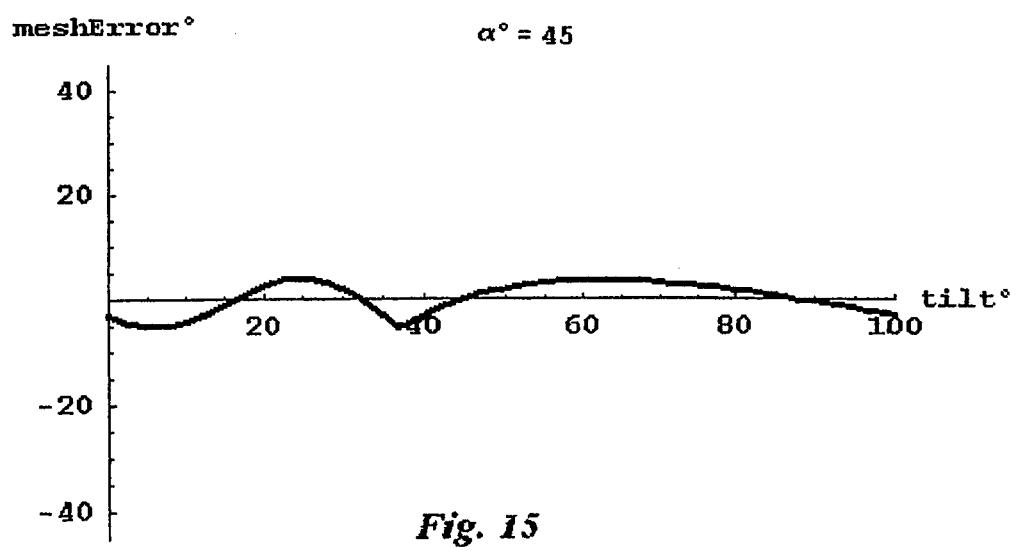

One version of this function, for 45° of cant, the offset being vertically upwards with offzz=0.6 and common gear ratio 9:13, gives the rigid geometry error shown in FIG. 14. Depending on other design factors such as real blade chord and thickness, this should be suitable for two, three or four bladed rotors, without the use of a differential gearbox, and so particularly suitable for the above embodiments.

Where there is significant longitudinal offset offxx rearwards of the common drive shaft from the tilt axis, meshing errors are increased. For example, for offxx=0.4, offzz=0.125, common gear ration of 1:3 and a differential gearbox engaging a simple fixed ratio at β=37°, the mesh error function shows a rigid geometry error which may be seen in FIG. 15.

This would be suitable for two, three or four bladed rotors.

In the embodiment shown in FIG. 12, the twin rotors 11c and 11d of the aircraft are mounted above the fuselage center line separately on pylons 30c and 30d which are capable of tilting independently from a lift position as shown from above in FIG. 12, to a substantially horizontal flight position behind the fuselage. The pylons 30c, 30d tilt about axis F-F in the vertical plane along the fuselage center line. The tilting is controlled so that the difference in the tilt angles of the pylons 30c and 30d is never less than that required for safe meshing of the rotor blades. As with the embodiment of FIGS. 9 to 11 in the forward flight position there is still an angle between the rotor axes, but if this is kept as small as possible the efficiency penalty due to part of the thrust of the rotors canceling-out is relatively small. In other respects, this aircraft follows the general principles described for aircraft 101 with details adjusted to suit its tandem arrangement.

In another embodiment an aircraft is built in the style of a Boeing Chinook® with a tiltable front tractor rotor and a tiltable rear pusher rotor, on the aircraft centre line. This may give an advantage in wing-borne cruise efficiency if one rotor (probably the pusher rotor) is stopped in flight and folded. Transition between rotor-borne and wing-borne flight is achieved by gradually tilting the front tractor rotor forwards to achieve sufficient air speed for the wings to take-over the lift function of the rear rotor which is gradually feathered and then either rotated rearwards then to share propulsion duties with the front rotor, or to be folded and stowed.

Also some intermediate configurations are feasible. For example in cruise if one rotor is left in the auto-gyro position (with its axis substantially vertical but tilted slightly back to take advantage of the autorotation mode of the disk) then the other rotor, tractor or pusher, propels the aircraft. The auto-rotating rotor shares the lift duty with the wings, that share being reduced as forward speed increases.

It then is not necessary for the auto-rotating rotor to be fully deployable between lift and (substantially horizontal) propulsion positions. It need be tiltable no more than is necessary for deployment between a helicopter mode and an autogyro mode.

Figure 16:
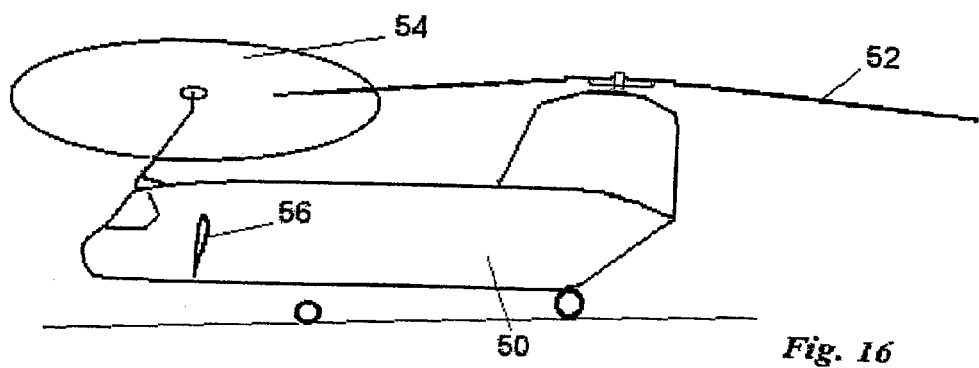
FIGS. 16 and 17 show a fifth embodiment of the invention.
Figure 17:
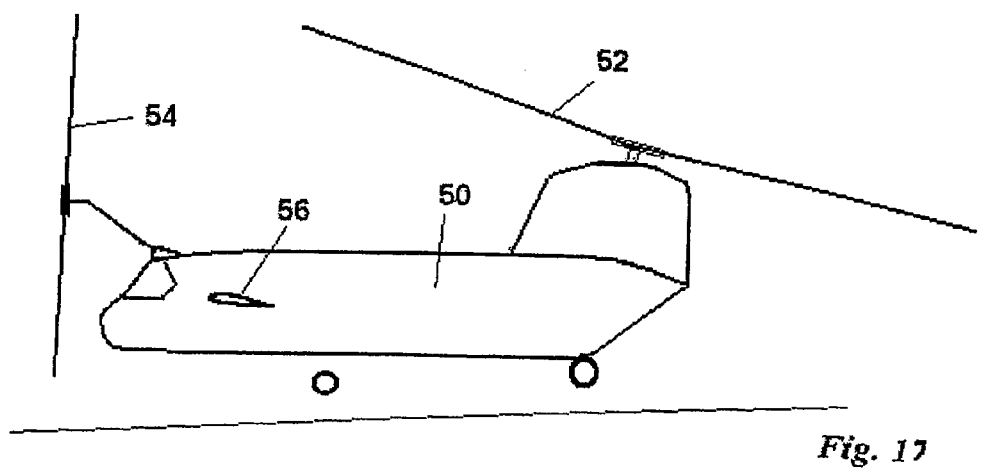

FIGS. 16 and 17 show diagrammatically such a configuration, where advantage is taken of the autogyro mode to provide much of the lift during forward flight, although some lift is still provided by forward stub wings.

The aircraft 50 is intended for heavy lifting duties; it has a very large rear rotor 52 having limited tilt capability and a smaller fully-tiltable front rotor 54. In FIG. 16 the aircraft is shown preparing for vertical take-off i.e. in helicopter mode. The front rotor is angled slightly about the longitudinal axis of the aircraft to provide a sideways thrust compensating for the torque reaction generated by the rear rotor. The front and rear rotors overlap and mesh according to the principles already described. The forward stub wings 56 are rotated about spanwise pivot axes is generally the same manner as described in connection with FIG. 4 so as to present their leading edges to the downwash of the front rotor 54.

FIG. 17 shows the aircraft airborne and having transitioned to forward flight. The rotor 52 has been tilted backward and put into autogyro mode, in which auto rotation of the rear rotor provides lift; if desired means can be provided to decouple it from its engine. The front rotor 54 has been tilted forward to provide forward propulsion and the wings 56 have been pivoted to operate as lift-providing surfaces. The aircraft proceeds in forward flight supported by the rear rotor 52 and the wings 54. When configured as in FIG. 17 the aircraft is capable of conventional take-off as well as landing; indeed it is shown about to make a rolling landing. An improvement in cruise range and speed compared to a conventional Chinook may be obtainable. When both rotors are in helicopter mode they each can of course provide forward propulsion by being tilted slightly forward so that their thrust has a rearward as well as a major downward component. Alternatively, it may be sufficient to achieve forward propulsion by use of the cyclic pitch controls.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Each feature disclosed in this specification (which term includes the claims) and/or shown in the drawings may be incorporated in the invention independently of other disclosed and/or illustrated features.

Statements in this specification of the "objects of the invention" relate to preferred embodiments of the invention, but not necessarily to all embodiments of the invention falling within the claims.

The description of the invention with reference to the drawings is by way of example only. The text of the abstract filed herewith is repeated here as part of the specification.

A tilt-rotor aircraft comprising a pair of contra-rotating co-axial tiltable rotors on the longitudinal center line of the aircraft. The rotors may be tiltable sequentially and independently. They may be moveable between a lift position and a flight position in front of or behind the fuselage.

The invention claimed is:

1. A tilt-rotor aircraft comprising a fuselage, wings for sustained forward flight, and a plurality of rotors, each rotor being independently and sequentially tiltable between a position above the aircraft providing lift and a position providing propulsion as a pusher propeller for forward flight, wherein the rotors are substantially in mesh.

2. An aircraft according to claim 1 in which the rotors are inclined to the roll axis of the aircraft, or to the pitch axis of the aircraft.

3. An aircraft according to claim 2 in which the angle of inclination is variable.

4. An aircraft according to claim 1 comprising a mechanism for varying the relative phase of the rotors to permit sequential tilting.

5. An aircraft according to claim 1 in which a tilt axis of the rotors is vertically or longitudinally offset from rotational axes of the rotors.

6. An aircraft according to claim 1 operable in three flight modes, a first of which is used below a first air speed, a second of which is used between the first airspeed and a second airspeed, and a third of which is used above the second airspeed.

7. An aircraft according to claim 6 in which the second flight mode is a compound mode, in which to maintain forward flight speed at least one of the rotors is in a position providing propulsion as a pusher propeller for forward flight or at least one of the rotors is in a position above the aircraft and tilted slightly forward providing propulsion as a helicopter in forward flight.

8. An aircraft according to claim 1 comprising mechanism configured to feather the rotors during transition between the lift and propulsion positions.

9. An aircraft according to claim 1 wherein the rotors are carried by supporting structure mounted on the fuselage.

10. An aircraft according to claim 9 wherein a said supporting structure is mounted to pivot about an axis extending transversely of an upper part of the aircraft fuselage.

11. A tilt-rotor aircraft according to claim 1 being of a twin-boom layout, wherein booms extend from the wings of the aircraft to support the aircraft's empennage, the rotors being disposed between the booms when the aircraft is in forward flight mode.

12. An aircraft according to claim 1 wherein at least inboard portions of the wings of the aircraft are moveable so as to present leading edges to the airflow generated from the rotors when in lift mode.

13. An aircraft according to claim 1 comprising a control surface on the fuselage, operative when the aircraft is in a lift mode and/or in transition between lift and forward flight modes.

* * * * *

UNITED STATES PATENT AND TRADEMARK OFFICE
CERTIFICATE OF CORRECTION

PATENT NO. : 7,584,923 B2  Page 1 of 1
APPLICATION NO. : 10/585505
DATED : September 8, 2009
INVENTOR(S) : Robert Graham Burrage It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 187 days.

Signed and Sealed this

Fourteenth Day of September, 2010

David J. Kappos
*Director of the United States Patent and Trademark Office*